No. 823,191.    PATENTED JUNE 12, 1906.
F. R. SAMMIS.
DITCHING MACHINE.
APPLICATION FILED JAN. 15, 1906.
3 SHEETS—SHEET 1.
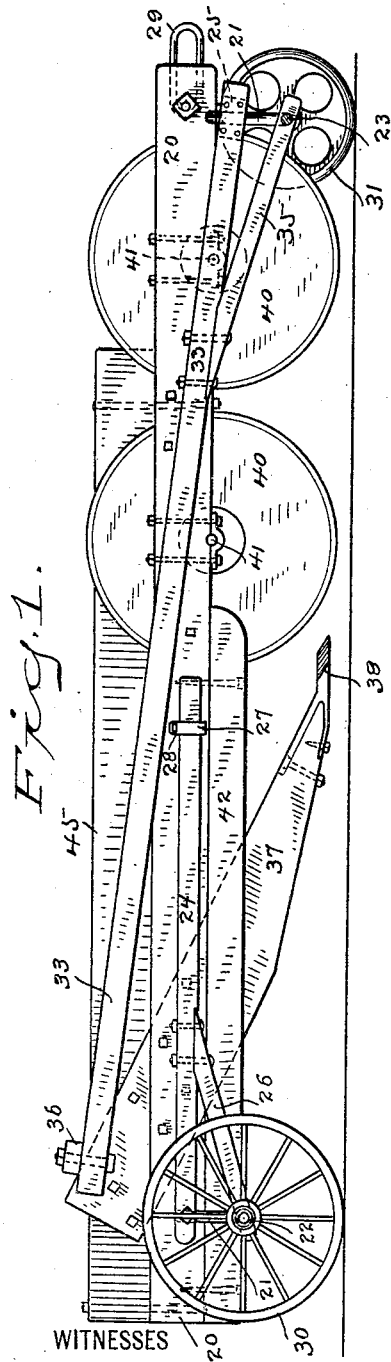
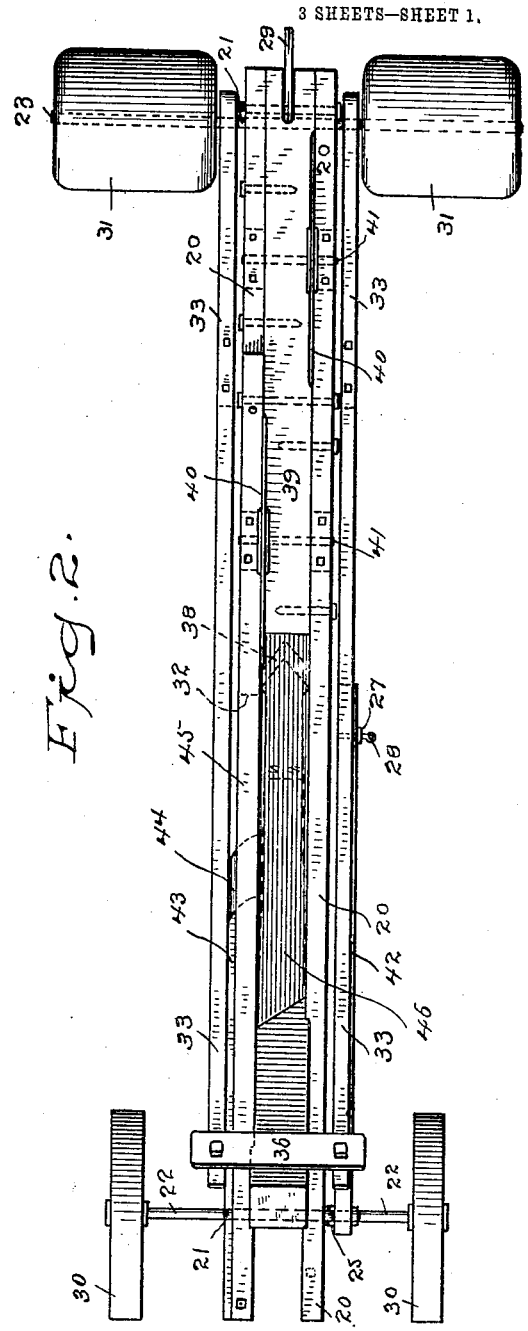
WITNESSES
H. A. Lamb.
S. W. Atherton.
INVENTOR
Frank R. Sammis
BY
A. M. Wooster
ATTORNEY

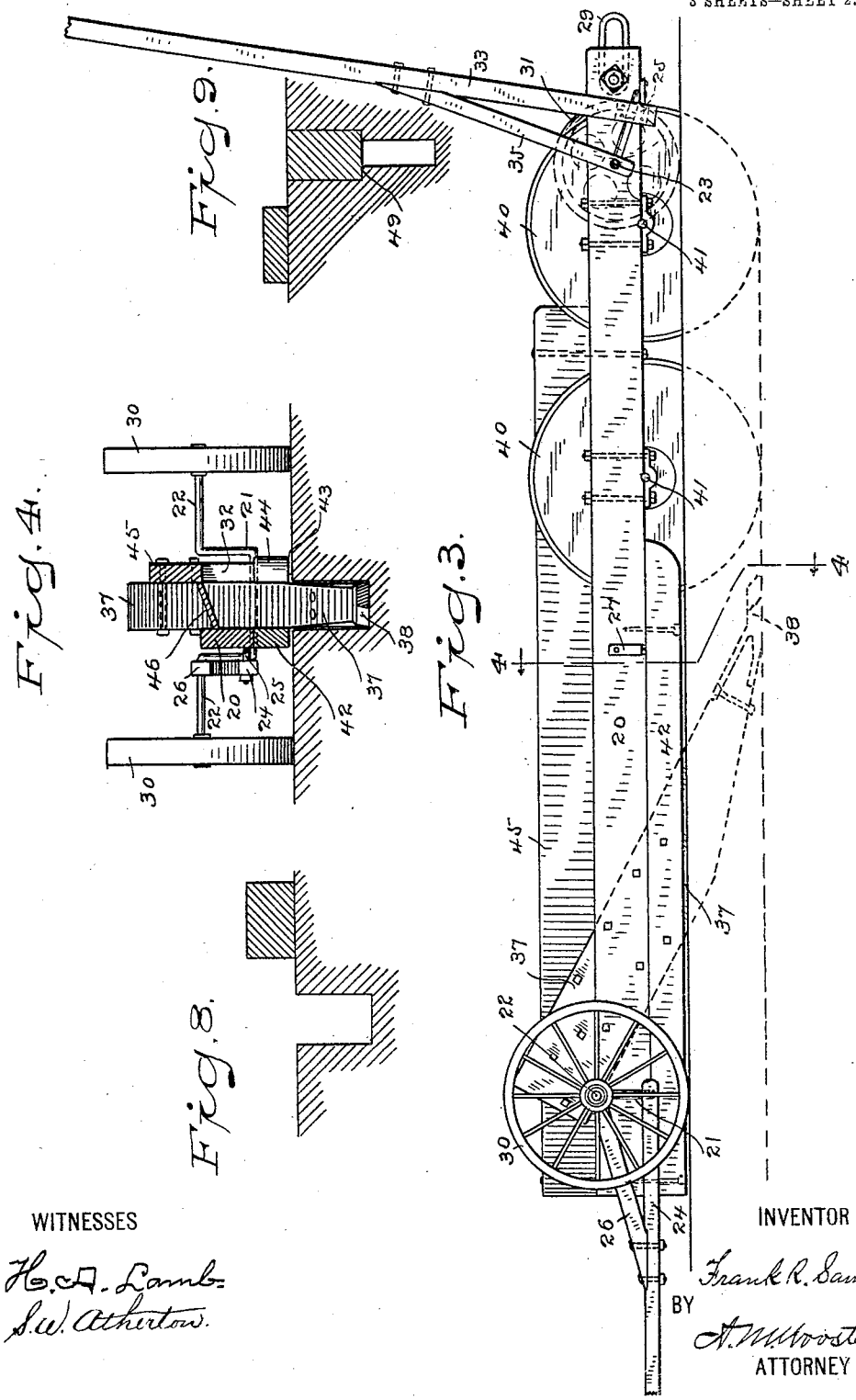

No. 823,191. PATENTED JUNE 12, 1906.
F. R. SAMMIS.
DITCHING MACHINE.
APPLICATION FILED JAN. 15, 1906.
3 SHEETS—SHEET 3.
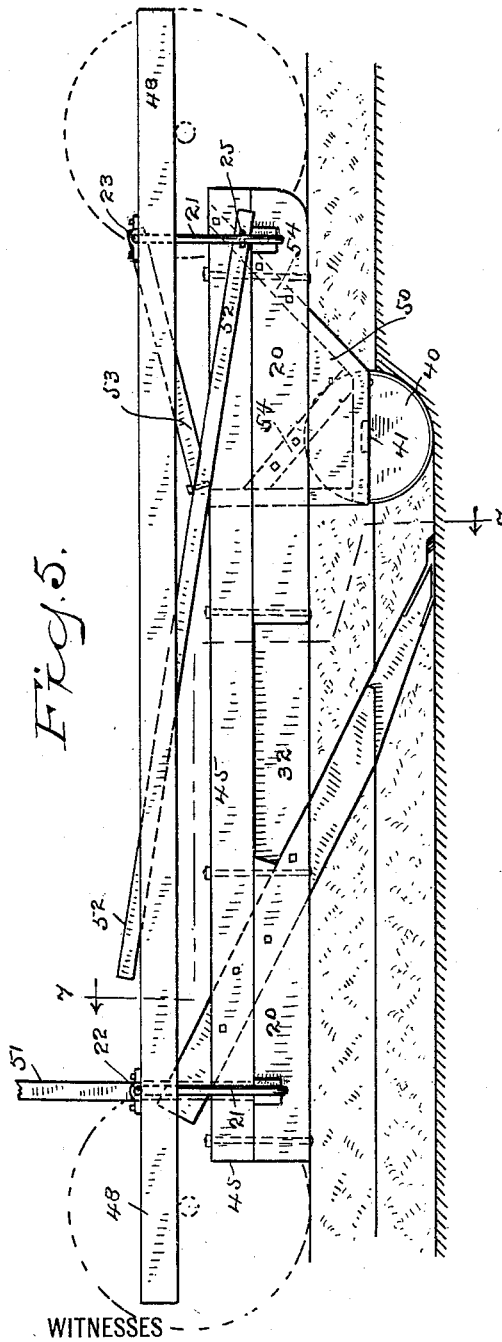
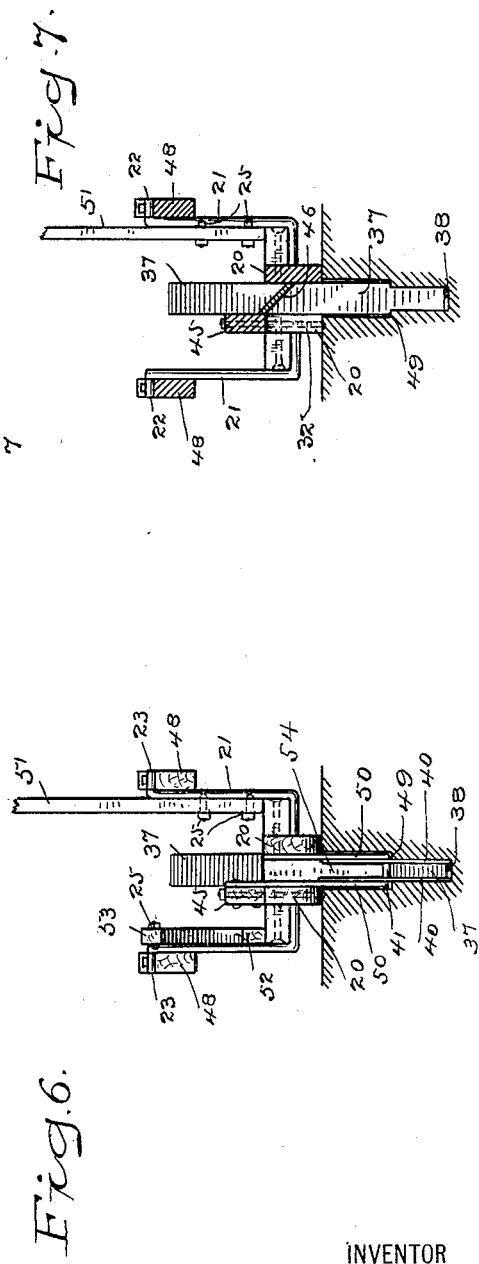
WITNESSES
H. A. Lamb.
S. W. Atherton.
INVENTOR
Frank R. Sammis
BY
A. M. Wooster
ATTORNEY

UNITED STATES PATENT OFFICE.

FRANK R. SAMMIS, OF STRATFORD, CONNECTICUT.

DITCHING-MACHINE.

No. 823,191.
Specification of Letters Patent.
Patented June 12, 1906.

Application filed January 15, 1906. Serial No. 295,998.

*To all whom it may concern:*

Be it known that I, FRANK R. SAMMIS, a citizen of the United States, residing at Stratford, county of Fairfield, State of Connecticut, have invented a new and useful Ditching-Machine, of which the following is a specification.

This invention has for its object to provide a novel method of and machine for making ditches. My novel method and machine are adapted for general use wherever wet land is to be drained and are especially adapted for use in reclaiming the large areas of "salt meadows," so called, which lie in many places along the seashore.

In order to make the reclaiming of salt meadows and other wet land comparatively easy, I have devised a novel method of making ditches which produces an entirely new form of ditch and which may be made very rapidly and at relatively trifling expense and will remain operative for many years, and in order to carry out my novel method I have devised a novel ditching-machine which is adapted to be propelled either by horses or by a traction-engine.

With these ends in view my invention consists in the novel method of making ditches and in the novel ditching-machine which I will now describe, referring to the accompanying drawings, forming a part of this specification, and using reference characters to indicate the several parts.

Figure 1 is a side elevation, one of the front wheels being removed, of a form of my novel ditching-machine in which one of the cutting-disks is placed in advance of the other, both the cutting-disks and the plow being shown in the raised or inoperative position; Fig. 2, a plan view corresponding with Fig. 1; Fig. 3, a side elevation, one of the front wheels being removed, showing the cutting-disks and plow lowered to the operative position as in use; Fig. 4, a transverse section on the line 4 4 in Fig. 3 looking toward the left—that is, toward the rear of the machine; Fig. 5, a side elevation of a variant form of my novel ditching-machine in which the cutting-disks are carried by the same transverse shaft, the cutting-disks and the plow being in operative position as in use and the position of wheels being indicated by dotted lines; Fig. 6, a front elevation corresponding with Fig. 5; Fig. 7, a transverse section on the line 7 7 in Fig. 5; Fig. 8, a cross-section illustrating an open ditch as made by my novel machine and method, and Fig. 9 is a cross-section illustrating a closed ditch made in accordance with my novel method.

20 denotes the side pieces, which are longitudinal strips, ordinarily of wood, and are pivotally suspended on cranks or offsets of rear and front shafts 22 and 23.

In the form illustrated in Figs. 1 to 4, inclusive, shafts 22 and 23 serve as the rear and front axles and carry, respectively, rear wheels 30 and front wheels 31. The front wheels are preferably made with a very wide tread to support the weight of the frame and prevent sinking upon soft ground and are rounded at the edges to permit them to slide over the top of the ground more easily in turning.

24 denotes a lever which is rigidly secured to the crank or offset 21 of the rear shaft, as by a clip 25, and which is provided with an angle-brace 26, which is pivoted on the shaft proper. The function of this lever is to raise and lower the rear end of the frame. When the frame is in the raised or inoperative position, as in Fig. 1, this lever projects forward and lies substantially parallel with the frame, the forward end lying in a socket 27, in which it may be locked by a pin 28, which is adapted to pass through the open upper end of the socket and engage the frame, as clearly shown in Figs. 1 and 2. When the frame is in the lowered or operative position, as in Fig. 3, this lever projects rearward substantially in alinement with the frame, as clearly shown in said figure. At the forward end of the frame is a link 29 for the attachment of horses or a traction-engine.

33 denotes a double lever the branches of which are rigidly secured to the crank or offset 21 of the front shaft, as by clips 25. Each branch is provided with an angle-brace 35, which is pivoted on the shaft proper, the rear ends of the branches being connected by a cross-piece 36. The function of this lever is to raise and lower the front end of the frame, and with it the plow and cutting disks, presently to be described. When the frame is in the raised or inoperative position, as in Fig. 1, this lever projects rearward and lies approximately parallel with the frame, as clearly shown in said figure. When the frame is in the lowered or operative position, as in Fig. 3, the lever projects upward in approximately a vertical position, as clearly shown in said figure. This lever is made relatively long and powerful, for the reason that considerable power is required to lift the forward end of the frame, and with it the cutting-disks and the plow out of the ground.

37 denotes the plow, which may be made of wood and is rigidly bolted in position at the required angle between the side pieces. At the point of the plow is a suitably-shaped metal share 38, which is rigidly bolted thereto. In front of the plow the space between the side pieces is filled by a center piece 39, which is rigidly bolted or screwed to the side pieces.

The operation of my novel machine is to make a ditch by cutting out and removing a continuous rectangular strip or plug of turf which will adhere together and retain its shape, owing to the thickly-interlaced long roots of the rank grass that grows on wet ground. This continuous strip or plug must first be cut out before it can be removed by the plow. The cutting out of the plug is accomplished by relatively large cutting-disks 40, carried by shafts 41, which are journaled on the under side of the frame. In this form I have shown the disks as placed one before the other on opposite sides of center piece 39 and between side pieces 20, the center piece being shown as slightly recessed to receive the cutting-disks. These disks cut down into the ground approximately the depth of the continuous strip that is to be removed by the plow.

In order to insure ample space for the delivery of the strip and render clogging impossible, I cut away or entirely remove a portion of the side piece on the delivery side of the machine and form a delivery-opening 32, and in order that this may not weaken the frame I rigidly bolt or screw to the side piece on the delivery side a top piece 45. 42 denotes a guard-strip which is rigidly screwed or bolted to the under side of the side piece opposite the delivery-opening—in the present instance the left side piece—to prevent the strip or plug from passing out on that side and also to lend additional rigidity to the frame of the machine, the forward end of said guard-strip being shown as rounded in the vertical plane to prevent the accumulation of material in front of it. 43 denotes a guide-strip rigidly screwed or bolted to the under side of the side piece having the delivery-opening—in the present instance the right side piece—the forward end of which is shown as rounded obliquely, as at 44, (see Figs. 2 and 4,) and as terminating in such a position as to turn the continuous strip or plug outward and move it a short distance from the ditch, as clearly shown in Fig. 8. 46 denotes an obliquely-placed guide-piece extending longitudinally from the plow to the center piece and transversely from below the top of the continuous cross-piece to the lower end of the top piece on the delivery side, the purpose of which is to insure that the continuous strip will not ride straight up the plow, but will be turned outward on the delivery side of the machine.

In the form illustrated in Figs. 5, 6, and 7 I have illustrated a variant form of the machine which may be used in connection with any pair of axles and set of wheels. In this form the side pieces are pivotally suspended on the cranks or offsets 21 of the shafts 22 and 23 substantially as in the other form. The shafts are mounted to oscillate on supporting-strips 48, which are adapted to rest upon the axles (shown only in dotted lines) and support the entire weight of the machine. The center piece, guard-strip, and guide-strip are dispensed with. In use the side strips lie close to the surface of the ground on opposite sides of the ditch, occupying substantially the same position as do the guard-strip and guide-strip in the other form. The crank or offset is shown as made wider than in the other form, the sides thereof lying close to the supporting-strip and the space between the side strips and the angles of the cranks being filled by blocks which are bolted to the side strips. The delivery of the plug or continuous strip in this form is toward the left instead of toward the right, and the obliquely-placed guide-piece 46 extends transversely from below the top of the right side piece, as seen in Fig. 7, to the lower end of the top piece on the delivery side. The rear end of the frame in this form is raised and lowered by means of a lever 51, which is rigidly secured to the rear crank or offset, as by clips 25. When the frame is in the lowered or operative position, this lever stands vertically, as in Fig. 5, and when the frame is in the raised or inoperative position the lever extends forward and lies substantially parallel with the frame, which is the reverse of the operation of the rear lever in the other form. The front end of the frame and with it the plow and cutting-disks are raised and lowered by means of a lever 52, which is provided with an angle-brace 53, said lever and said brace being rigidly secured to the side of the offset, as by clips 25. When the frame is in the lowered or operative position, this lever extends rearward and lies substantially parallel with the frame, as in Fig. 5, and when the frame is in the raised or inoperative position the lever extends substantially vertically, which is the reverse of the operation of the front lever in the other form, the inoperative position of the levers in this form not being shown in the drawings.

In Fig. 8 I have illustrated an open ditch as made by my novel machine, in which the continuous strip or plug is thrown out upon one side of the ditch, moved a slight distance from the edge of the ditch, and allowed to remain there. In Fig. 9 I have illustrated a novel form of subsoil or closed ditch, which is made by using two of my novel ditching-machines successively, the second machine using a plow approximately half the width of the plow used by the first machine and which is set to cut a second or subsoil ditch below and at the center of the first ditch, the continuous strip or plug thrown out by the second machine being thrown out on the opposite side of the ditch from that thrown out by the first machine. The strip thrown out by the first machine is then replaced either by hand or by a suitable machine in the ditch from which it was removed, the bottom of said strip resting upon shoulders 49 on opposite sides of the second or lower ditch and leaving said second or lower ditch entirely open, as clearly shown in Fig. 9. The exact width of the plows used or the depth of the continuous strips or plugs removed are of course not of the essence of the invention. I preferably use plows upon the two machines that will make cuts—that is, dig ditches—of substantially the proportions indicated in Figs. 8 and 9.

It is of course immaterial so far as the present invention is concerned whether the two plows used are of the form illustrated in Figs. 1 to 4, inclusive, or the form illustrated in Figs. 5 to 7, inclusive, or whether one form of machine is used for making the first ditch and the other form is used for making the second ditch. In the drawings I have illustrated the first form with a relatively wide plow for making the first ditch and the second form with a relatively narrow plow set deeper to make the second or subsoil ditch. It will be noted that in the second form the cutting-disks 40 lie side by side and are carried by a single shaft 41. The space between the outer sides of the disks and the walls of the first ditch is filled by guide-plates 50, which are rigidly secured to side pieces 20. Shaft 41 in this form is shown as journaled in a central frame 54, which is rigidly bolted to the side pieces and the guide-plates, the frame being recessed to receive the cutting-disks.

Having thus described my invention, I claim—

1. A ditching-machine consisting essentially of side pieces one of which is provided with a delivery-opening, shafts having cranks from which said side pieces are suspended, a plow rigidly secured to the side pieces for removing a continuous strip which is delivered through the opening, and cutting-disks in advance of the plow for cutting out the continuous strip.

2. A ditching-machine consisting essentially of side pieces one of which is provided with a delivery-opening, shafts having cranks from which said side pieces are suspended, a plow rigidly secured to the side pieces for removing a continuous strip which is delivered through the opening, cutting-disks in advance of the plow for cutting out the continuous strip and means for oscillating the shafts to raise and lower the side pieces, plow and cutting-disks out of and into operative position.

3. A ditching-machine consisting essentially of side pieces one of which is provided with a delivery-opening, shafts having cranks from which said side pieces are suspended, a plow rigidly secured to the side pieces for removing a continuous strip which is delivered through the opening, cutting-disks in advance of the plow for cutting out the continuous strip and levers rigidly secured to the cranks for raising and lowering the side pieces and parts carried thereby, substantially as described, for the purpose specified.

4. A ditching-machine consisting essentially of side pieces one of which is provided with a delivery-opening, shafts having cranks from which said side pieces are suspended, a plow rigidly secured to the side pieces for removing a continuous strip which is delivered through the opening, cutting-disks in advance of the plow for cutting out the continuous strip and means for removing the strip thrown out by the plow from the edge of the ditch.

5. A ditching-machine consisting essentially of side pieces one of which is provided with a delivery-opening, shafts having cranks from which said side pieces are suspended, supporting-strips on which the shafts are mounted to oscillate, a plow rigidly secured to the side pieces for removing a continuous strip which is delivered through the opening and cutting-disks in advance of the plow for cutting out the continuous strip.

6. A ditching-machine consisting essentially of side pieces one of which is provided with a delivery-opening, shafts having cranks from which said side pieces are suspended, a plow rigidly secured to the side pieces for removing a strip of material which is delivered through the opening, cutting-disks and guide-plates rigidly secured to the side pieces.

7. A ditching-machine consisting essentially of side pieces one of which is provided with a delivery-opening, shafts having cranks from which said side pieces are suspended, a plow rigidly secured to the side pieces for removing a strip of material which is delivered through the opening, guide-plates rigidly secured to the side pieces, a central frame and cutting-disks carried by shafts journaled in said frame for cutting out the continuous strip.

8. The method of making ditches, which consists in cutting two strips of earth, one below the other, the lower one being of less width than the upper one, removing said cut strips, and then replacing the upper strip.

9. The herein-described method of making ditches, which consists in making side cuts, removing the material from between said side cuts without disintegration, making a second pair of side cuts within said first side cuts and below the same, removing the material from between said second cuts and returning the material removed from between said first cuts, whereby a covered ditch is formed between said second cuts.

10. The herein-described method of making ditches which consists in making side cuts approximately the depth of a first ditch, removing the material from between said cuts in the form of a continuous strip, making two cuts closer together below the first ditch and between the sides thereof, removing the material from between said second cuts and returning the strip removed from the first ditch, thereby forming a subsoil ditch.

11. The herein-described method of making ditches, which consists in making parallel side cuts approximately the depth of a first ditch, removing the material from between said cuts in the form of a continuous strip, making two parallel cuts closer together below the first ditch and midway between the sides thereof, removing the material from between said second cuts and returning the strip removed from the first ditch to the place from which it was removed, thereby covering the second ditch and forming a covered subsoil ditch.

In testimony whereof I affix my signature in presence of two witnesses.

FRANK R. SAMMIS.

Witnesses:
A. M. WOOSTER,
S. W. ATHERTON.